April 15, 1958   L. L. GAUBIS ET AL   2,830,668
HYDRAULIC SYSTEM FOR AN AERONAUTICAL PROPELLER
Filed Nov. 1, 1956
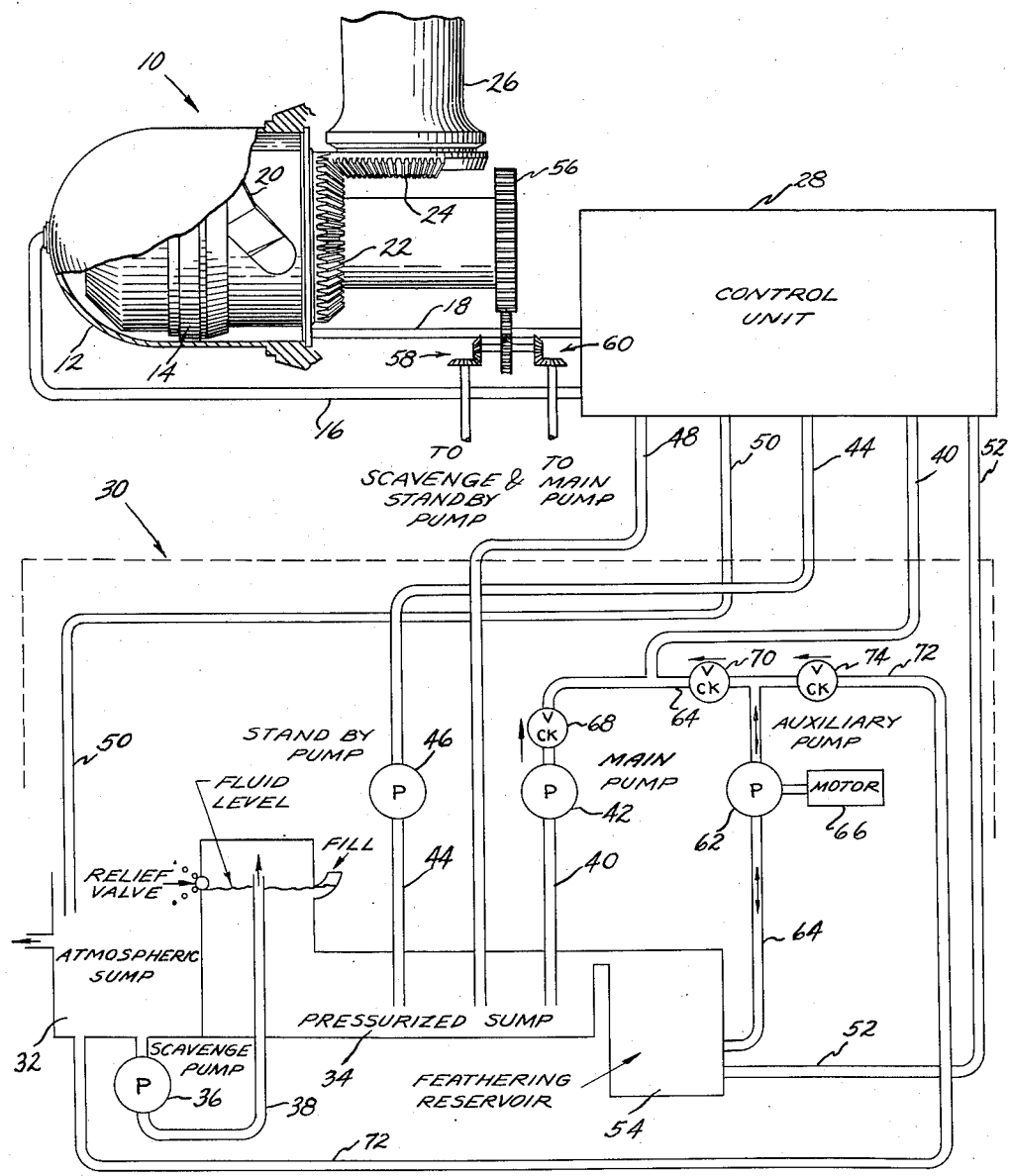
INVENTORS
LEONARD L. GAUBIS
DAVID R. PEARL
BY
*Teller & McCormick*
ATTORNEYS United States Patent Office 2,830,668
Patented Apr. 15, 1958

2,830,668

HYDRAULIC SYSTEM FOR AN AERONAUTICAL PROPELLER

Leonard L. Gaubis, Granby, and David R. Pearl, West Hartford, Conn., assignors to United Aircraft Corporation, East Hartford, Conn., a corporation of Delaware Application November 1, 1956, Serial No. 619,873

3 Claims. (Cl. 170—160.2)

This invention relates to an aeronautical propeller of the type having adjustable pitch blades and pitch changing mechanism which utilizes hydraulic fluid, the improvement residing specifically in a hydraulic supply system for such a propeller.

It is the general object of the invention to provide a supply system for the hydraulic pitch changing mechanism of an aeronautical propeller which will assure full and proper pitch control under all conditions including conditions and circumstances where failure might occur in use of a conventional supply system.

The more specific objects as well as the novel features of the invention will become apparent to those skilled in the art from the following description having reference to the attached drawing wherein the single figure comprises a schematic illustration of the propeller and the hydraulic system therefor.

The propeller illustrated in the drawing is merely exemplary, it being understood that any propeller which uses hydraulic fluid for controlling blade pitch may advantageously employ the hydraulic supply system of this invention. The said exemplary propeller comprises a nose assembly 10 which includes a cylinder 12 and a piston 14 which is movable within the cylinder responsive to hydraulic pressure introduced to the cylinder through suitable conduits 16 and 18. The conduit 16 is connected to the front or nose end of the cylinder 12 and the conduit 18 is connected with the rear end thereof. Obviously, by introducing fluid under pressure selectively through the conduits 16 and 18, the piston 14 can be moved within the cylinder. By means of cam slots 20 and cam rollers (not shown), rectilinear movement of the piston 14 causes rotation of a gear 22 which is engaged with gears or segments 24 on the inner ends of the propeller blades, such as the blade 26, whereby to change the pitch of the blades by rotating the same on their generally longitudinal pitch change axes.

In addition to the aforedescribed hydraulically operated motor, the pitch changing mechanism of the propeller includes a control unit 28. The control unit 28 comprises a plurality of valves and other components adapted to receive hydraulic fluid from a supply system 30 and to direct the fluid under pressure selectively into the conduit 16 or into the conduit 18 while connecting the other of the said conduits to a drain, whereby selectively to vary the pitch of the propeller blades. That is, one of the conduits, for example, the conduit 16, must introduce fluid to the cylinder 12 while the conduit 18 is connected to drain in order to cause piston and gear movement in a direction which will effect pitch change toward high pitch. The other conduit 18 must introduce fluid to the cylinder 12 while the conduit 16 is connected to drain in order to cause piston and gear movement in the other direction to effect a change toward low pitch. Obviously, when there is no flow through either of the conduits 16 and 18, there will be no change in blade pitch.

The improvement of the present invention resides in the hydraulic supply system 30, and the improved supply system can be employed with a variety of control devices or units which are adapted to control flow of hydraulic fluid from the supply system to a propeller of the aforedescribed type. Therefore, no specific control unit has been shown. A typical control unit 28 adapted for the intended purpose may include one of more pressure regulating valves which receive fluid from the supply system, one or more pilot or governor valves which control fluid flow from the regulating valves, a distributing valve which routes the flow into the high pitch conduit 16 or the low pitch conduit 18, and in addition the typical control unit 28 includes actuating means which may be operated by the aircraft pilot or which may be automatically operated to position or condition the various control elements to effect a selected or necessary pitch change. The manual or pilot operation of the actuating means can effect pitch control for all flight and ground operating conditions including the ability to feather the propeller blades and to reverse their pitch. The automatic operation is generally effected by mechanical linkage from the propeller to the control unit, the arrangement being such as to provide for pitch change responsive to change in propeller speed.

Referring now to the hydraulic supply system 30, it will be observed that the same includes an atmospheric sump 32, a pressurized sump 34, and a scavenge pump 36 and a conduit 38 interconnecting the said sumps to discharge hydraulic fluid from the atmospheric sump into the pressurized sump. The hydraulic supply system also includes a main outlet conduit 40 and a main pump 42 connected therein to supply hydraulic fluid under pressure from the pressurized sump 34 to the control unit 28. A second supply conduit 44 which includes a standby pump 46 is connected between the pressurized sump and the control unit, the stand-by pump 46 operating simultaneously with the main pump 42 whereby hydraulic fluid is normally pumped to the control unit 28 through both of the conduits 40 and 44. In addition to the supply conduits, the control unit 28 and the hydraulic supply system 30 are interconnected by a plurality of drain conduits 48, 50 and 52, the drain conduit 48 extending from the control unit 28 into the pressurized sump 34, the drain conduit 50 extending from the control unit to the atmospheric sump 52, and the drain conduit 52 extending from the control unit into a feathering reservoir 54 forming a part of the pressurized sump.

In normal operation of the hydraulic system, the scavenge pump 36, the stand-by pump 46, and the main pump 42 are driven by the propeller. That is, a drive gear 56 can be secured as schematically illustrated to the propeller shaft or hub for rotation therewith to drive gear trains indicated generally at 58 and 60 which are connected to the scavenge pump and stand-by pump and to the main pump, respectively. "Normal operation" is meant to include all operating conditions wherein the propeller rotates with sufficient speed to operate the aforesaid pumps whereby to supply hydraulic fluid to the control unit and to the propeller assembly 10 to effect the necessary or desired pitch change.

However, there are conditions under which it is desirable or necessary to effect a propeller pitch change when the propeller is not rotating at all or is rotating at a very low speed. For example, when the pilot desires to feather the propeller blades, he may actuate the control mechanism for this purpose and the propeller rotation will operate the stand-by and main pumps and the scavenge pump at sufficient speeds to supply hydraulic fluid to the control unit while the propeller pitch is changed in the high direction approaching the full feather position. However, as the blades approach the full feather position, the speed of the propeller rotation diminishes and thus the scavenge pump, stand-by pump and main pump will be operated at less speed whereby the hydraulic supply to the control unit 28 is insufficient.

To overcome this disadvantage, an auxiliary pump 62 is incorporated in the hydraulic supply system in a conduit 64 which communicates with the main supply conduit 40 between the main pump 42 and the control unit 28. The auxiliary pump 62 is operated by a motor 66 which is preferably automatically energized when the propeller speed reaches a selected minimum. Thus, when propeller speed diminishes as the blades approach a full feather position, the pump 62 is operated to supply hydraulic fluid under pressure from the feathering reservoir 54 to the control unit 28. A check valve 68 is provided in the main conduit 40 to close when the auxiliary pump is operated whereby to prevent return flow to the pressurized sump through the said main conduit. Another, normally closed check valve 70 is incorporated in the auxiliary conduit 64, this check valve being adapted to open when the auxiliary pump is operated whereby to permit flow through the auxiliary conduit 64 into the main supply conduit 40. Thus, a supply of pressurized hydraulic fluid is maintained to assure propeller control and pitch change to the full feather position despite the fact that propeller rotation diminishes and ceases.

The auxiliary pump and motor 62 and 66 are not only energized during flight operation to feather the blades of the propeller assembly, but are also energized during ground checking of the propeller. That is, the auxiliary pump and motor can be employed without propeller rotation to supply the control unit 28 with hydraulic fluid under pressure for the purpose of running the propeller blades through a complete range of pitch changes to check the operation of all of the components of the propeller control system. Such ground operation and checking of the propeller system and assembly may involve a substantial period of time and considerable operation during which the scavenge pump 36 cannot be operated to remove hydraulic fluid from the atmospheric sump 32. During the aforesaid period of time and operation of the propeller system by use of the auxiliary pump and motor, hydraulic fluid from the control unit will be returned to the atmospheric sump through the drain conduit 50. In addition, the atmospheric sump may receive lubricating fluid from other conduits, not shown. Thus, there is the possibility and the likelihood that the atmospheric sump will become flooded.

It is a feature of the present invention that flooding of the atmospheric sump can be avoided by reverse operation of the auxiliary pump and motor. That is, the auxiliary pump 62 is preferably of the gear type which can be reversibly driven and the auxiliary motor 66 is preferably a reversible electric motor. Reverse operation of the auxiliary pump and motor is utilized to scavenge the atmospheric sump by providing a scavenge conduit 72 which extends from the atmospheric sump 32 to the auxiliary conduit 64 between the auxiliary pump 62 and the check valve 70. A check valve 74 is provided in the scavenge conduit 72 to open only when the auxiliary pump is operated in the reverse direction.

Thus, when the auxiliary pump 62 is operated in the reverse direction, the check valve 70 will close and the check valve 74 will open and hydraulic fluid from the atmospheric sump will be directed through the auxiliary pump to the pressurized sump 34 through the feathering reservoir 54. Experience has shown that it will be necessary to reverse the normal direction of operation of the auxiliary pump and motor only at infrequent intervals to prevent possible flooding of the atmospheric sump.

The invention claimed is:

1. A hydraulic supply system for an aeronautical propeller of the type having adjustable pitch blades and pitch changing mechanism which utilizes hydraulic fluid, the said supply system comprising an atmospheric sump and a pressurized sump, a scavenge pump and conduit means interconnecting said sumps to discharge hydraulic fluid from said atmospheric sump to said pressurized sump, a main pump and conduit means interconnecting said pressurized sump and the pitch changing mechanism to supply the latter with hydraulic fluid under pressure, the said scavenge pump and main pump being adapted for operation during propeller rotation, an auxiliary conduit interconnecting said pressurized sump and said pitch changing mechanism, a reversibly operable auxiliary pump disposed in said auxiliary conduit and adapted when operated in one direction to supply said pitch changing mechanism with hydraulic fluid under pressure, a scavenge conduit extending from said atmospheric sump and communicating with said auxiliary conduit between said auxiliary pump and the pitch changing mechanism whereby to discharge fluid from the atmospheric sump into the pressurized sump when said auxiliary pump is operated in the other direction, and a check valve disposed in the scavenge conduit and adapted to open for flow only from said atmospheric sump into said auxiliary conduit.

2. A hydraulic supply system for an aeronautical propeller of the type having adjustable pitch blades and pitch changing mechanism which utilizes hydraulic fluid, the said supply system comprising an atmospheric sump and a pressurized sump, a scavenge pump and conduit means interconnecting said sumps to discharge hydraulic fluid from said atmospheric sump into said pressurized sump, a main pump and conduit means interconnecting said pressurized sump and the pitch changing mechanism to supply the latter with hydraulic fluid under pressure, drive means connecting the propeller with the scavenge pump and the main pump whereby to drive the pumps responsive to propeller rotation, an auxiliary conduit interconnecting said pressurized sump and said pitch changing mechanism, a reversibly operable auxiliary pump disposed in said auxiliary conduit and adapted when operated in one direction to supply said pitch changing mechanism with hydraulic fluid under pressure, a scavenge conduit extending from said atmospheric sump and communicating with said auxiliary conduit between said auxiliary pump and the pitch changing mechanism whereby to discharge fluid from the atmospheric sump into the pressurized sump when said auxiliary pump is operated in the other direction, and a check valve disposed in the scavenge conduit and adapted to open for flow only from said atmospheric sump into said auxiliary conduit.

3. A hydraulic supply system for an aeronautical propeller of the type having adjustable pitch blades and pitch changing mechanism which utilizes hydraulic fluid, the said supply system comprising an atmospheric sump and a pressurized sump, a scavenge pump and conduit means interconnecting said sumps to discharge hydraulic fluid from said atmospheric sump into said pressurized sump, a main pump and supply conduit interconnecting said pressurized sump and the pitch changing mechanism to supply the latter with hydraulic fluid under pressure, a first check valve disposed in said main supply conduit between said main pump and said pitch changing mechanism, drive means connecting the propeller with the scavenge pump and the main pump whereby to drive the said pump responsive to propeller rotation, an auxiliary conduit extending from said pressurized sump to said main conduit between said first check valve and the pitch changing mechanism, a reversibly operable auxiliary pump disposed in said auxiliary conduit and adapted when operated in one direction to supply said pitch changing mechanism with hydraulic fluid under pressure, drive means for said auxiliary pump, a second check valve disposed in said auxiliary conduit between said auxiliary pump and said main conduit, the said first and second check valves being adapted to respectively open and close when said main pump is operated and to respectively close and open when said auxiliary pump is operated in said one direction, a scavenge conduit extending from said atmospheric sump to said auxiliary conduit between said second check valve and said auxiliary pump whereby to discharge fluid from the atmospheric sump into the pressurized sump when said auxiliary pump is operated in the other direction, and a third check valve disposed in said scavenge conduit and adapted to open for flow only from said atmospheric sump into said auxiliary conduit.

References Cited in the file of this patent

UNITED STATES PATENTS 2,653,668     Anderson _____ Sept. 29, 1953